US006513711B1

United States Patent
Hjelmvik

(12) United States Patent
(10) Patent No.: US 6,513,711 B1
(45) Date of Patent: Feb. 4, 2003

(54) VEHICLE PARKING CONTROL SYSTEM

(75) Inventor: Torbernt Hjelmvik, Järfälla (SE)

(73) Assignee: Modul-System Sweden AB, Järfälla (SE)

( * ) Notice: Subject to any disclaimer, the term of this patent is extended or adjusted under 35 U.S.C. 154(b) by 336 days.

(21) Appl. No.: 10/049,557

(22) PCT Filed: Aug. 30, 2000

(86) PCT No.: PCT/SE00/01666

§ 371 (c)(1),
(2), (4) Date: Feb. 14, 2002

(87) PCT Pub. No.: WO01/16906

PCT Pub. Date: Mar. 8, 2001

(30) Foreign Application Priority Data

Sep. 1, 1999 (SE) ................................................ 9903086

(51) Int. Cl.$^7$ ................................................ G06F 17/60
(52) U.S. Cl. ........................ 235/385; 235/381; 235/384; 705/1; 705/13
(58) Field of Search ................................ 235/384, 381, 235/382, 385, 492; 340/5.5, 539, 904, 932, 988; 705/13, 118; 701/1, 118

(56) References Cited

U.S. PATENT DOCUMENTS 5,351,187 A * 9/1994 Hassett ........................ 235/384
5,905,247 A * 5/1999 Ilen .............................. 235/381
RE37,822 E * 8/2002 Anthonyson ................. 235/378

FOREIGN PATENT DOCUMENTS

| WO | WO 93/20539 | 10/1993 |
| WO | WO 96/11453 | 4/1996 |
| WO | WO 96/27170 | 9/1996 |
| WO | WO 97/13222 | 4/1997 |
| WO | WO 98/30982 | 7/1998 |
| WO | WO 99/48062 | 9/1999 |

* cited by examiner

Primary Examiner—Thien M. Le
Assistant Examiner—Edwyn Labaze
(74) Attorney, Agent, or Firm—Alfred J. Mangels

(57) ABSTRACT

A parking control system in which a user sends a code to a receiving computer via a telephone system when beginning and terminating a parking period. A vehicle reference, such as a bar code carried by the vehicle or the vehicle registration number, is used to identify the vehicle. Parking time billing is effected by a credit card number coupled to the user. When checking a parked vehicle, a car park attendant causes a control unit to read and store the vehicle reference for marked vehicles, and also to store the date and time. The control unit memory contents are transmitted to the receiving computer and are compared with vehicle parking information that was received by telephone. A parking fine is issued for parked vehicles not having properly commenced a parking period.

18 Claims, 1 Drawing Sheet

VEHICLE PARKING CONTROL SYSTEM

SUBSTITUTE SPECIFICATION (Including All Changes From Published International Application No. PCT/SE00/01666)

BACKGROUND OF THE INVENTION

1. Field of the Invention

The present invention relates to a vehicle parking control system, primarily for cars. More specifically, the invention relates to a parking system in which a mobile telephone is used to commence and terminate parking of a vehicle.

2. Description of the Related Art

A system in which parking of a vehicle is initiated and also terminated with the aid of a mobile telephone is known to the art. According to one such known system, described in the International Patent Application WO 93/20539, a code which identifies the parking site concerned, a vehicle identification code, and a unique code for the driver of the vehicle are sent via the mobile telephone both when commencing and when terminating parking of the vehicle. It is suggested that the vehicle-parking fee be billed through the standard telephone bill.

Swedish Patent Specification 9800888-1 teaches a parking system in which a mobile telephone can be used to commence and terminate parking of a vehicle, where a user sends at least one code to a receiving computer via a mobile telephone or a fixed telephone system when commencing and terminating parking of a vehicle. The number of a credit card or like means of payment in the user's possession and acceptable by the parking system as means of payment is stored in a database belonging to the computer of the company that owns the car park, together with at least one user-specific reference.

According to one embodiment, a plastic card is produced in the format of a credit card when a user connects to the system. The plastic card contains a machine-readable code that constitutes the user-specific code. For instance, the code has the form of a bar code written on the card. When parking a vehicle, this plastic card is intended to be placed inside the vehicle in a position in which it can be read by a car park attendant from outside the vehicle.

According to this latter patent specification, the car park attendants are equipped with a portable communication unit which is in cordless or wireless connection with a computer belonging to the company that owns the car park concerned and containing information relating to vehicles that have commenced a parking period but have not yet terminated parking. The communications unit may, for instance, be designed in accordance with the control unit described in Swedish Patent Specification 9700054-1. In this case, the car park attendant enters the parking zone concerned into the control unit, which fetches from the computer a so-called parked car list concerning the parking zone in question, i.e., a list of the registration numbers of cars, or vehicles, that have announced the commencement of a parking period. The control unit then compares the read registration numbers with the parked car list and gives an indication when commenced parking of a vehicle has not been recorded.

Alternatively, when a user-specific reference in the form of a plastic card is placed so that it can be seen, the control unit reads the plastic card instead and makes a corresponding comparison with a list of plastic card codes in respect of which commenced vehicle parking has been announced.

This system involves a great deal of comprehensive communication between the control unit used by the car park attendant and the company computer. In principle, two-way communication is required for each vehicle checked. This communication takes a long time to effect and is troublesome to the car park attendant involved. Furthermore, transmission disturbances occur as a result of radio shadows and other disturbance or interference sources, among other things.

Accordingly, an object of the invention is to reduce the extent to which radio communication is necessary and to enable checks to be carried out by the car park attendants more easily in other respects.

This object is fulfilled by the present invention.

SUMMARY OF THE INVENTION

The present invention thus relates to a parking control system in a parking system in which a mobile telephone can be used to commence and to terminate parking of a vehicle. A user sends at least one code to a receiving computer via a mobile telephone system or via a fixed telephone system when beginning and terminating a parking period. A user-specific vehicle reference, such as a machine readable code or a vehicle registration number is used to identify the vehicle. Parking time billing is effected by means of a computer belonging to the company owning the car park, hereinafter called the company computer, into which a credit card number or the number of a similar card belonging to the user is loaded. A vehicle that can be parked with the aid of a telephone is provided with a reference marking. When checking a parked vehicle a car park attendant causes a control unit to mechanically read the vehicle reference for marked vehicles. The vehicle reference is stored in the control unit together with the current date and time of day. The memory contents of the control unit are transferred into the company computer at a later time stage and there compared with stored information referring to commenced and terminated parking of respective vehicles received by telephone. Parked vehicles which have not been recorded in the company computer at the time of carrying out the check are identified and a parking fine is issued by the company in respect of said vehicles.

BRIEF DESCRIPTION OF THE DRAWINGS

The invention will now be described in more detail with reference to an exemplifying embodiment thereof and also with reference to the accompanying drawings, in which.

DESCRIPTION OF THE PREFERRED EMBODIMENTS

The present invention relates to a vehicle parking system in which a mobile telephone can be used to commence and terminate parking of a vehicle. When commencing and terminating a parking period a user sends at least one code to a receiving computer via a mobile telephone system or a fixed telephone system. The parking system can thus be used with both mobile telephones and fixed telephone installations.

The system utilizes a user-specific reference, which can be one of several different types.

Figure 1:
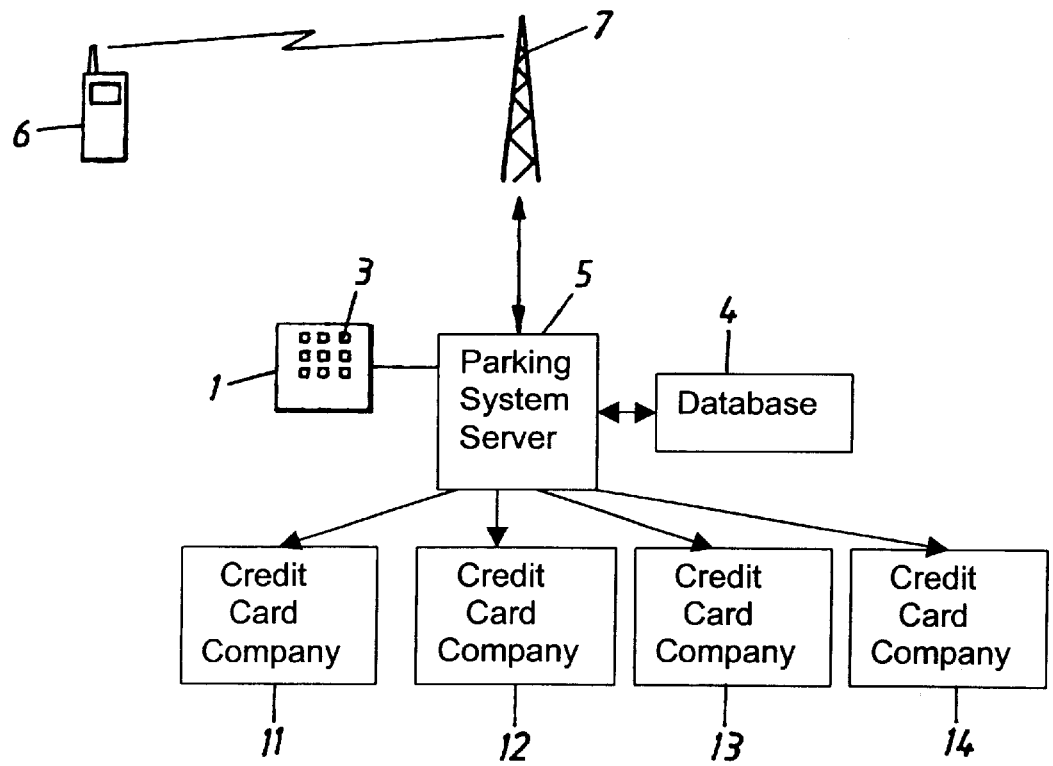
FIG. 1 is a block diagram illustrating an inventive parking system.

According to one embodiment, shown in FIG. 1, the user-specific reference is the number of the telephone used to commence parking of a vehicle. In this case, the telephone number is sensed by the parking system server 5 when the telephone 6 is connected to a telephone number associated with the parking system. The server is connected to a database 4 that contains the user-specific reference, a vehicle reference and, e.g., the credit card number concerned. With regard to a mobile telephone system, for instance a GSM system, the telephone 6 is connected to the server 5 of the parking company, via a base station 7.

According to this embodiment, billing of the credit card tied to the telephone number in the database is validated, by sensing the telephone number concerned.

Alternatively, the user-specific reference may be a personal code used in conjunction with vehicle parking. This code may be a four-digit PIN code, which is sent to the server 5 of the parking company via the telephone when parking is commenced or terminated respectively.

Figure 2:
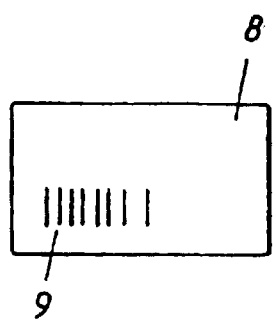
FIG. 2 illustrates one embodiment of a user-specific reference.

The system also includes a vehicle reference. According to a first embodiment, the vehicle reference has the form of a bar code, which is placed in the vehicle so that it can be read with the aid of a bar code reader from outside the vehicle. As shown in FIG. 2, bar code 9 may be written on a plastic card 8. In this case, the plastic card constitutes a vehicle marking that reveals that a telephone has been used to commence parking of the vehicle.

The advantage of using a plastic card that contains a machine-readable code that can be read from outside the vehicle is that the user can park any vehicle whatsoever by placing the card in the vehicle concerned so that the card can be seen from outside the vehicle, and by making a call to the parking company server 5 both when commencing and when terminating parking of the vehicle.

Instead of a machine-readable optical code, an electronic passive transponder that contains a code can be placed in the vehicle so that it can be read from outside the vehicle with the aid of a transceiver unit.

According to another embodiment of the invention, the vehicle reference is comprised of the vehicle registration number. The control unit described in Swedish Patent Specification 9700054-1 can be used in this case. The described control unit is adapted to read and store the vehicle registration number. In this case, the vehicle can be marked with a sticker or some corresponding device that shows that a telephone has been used in conjunction with parking the vehicle.

The registration number of the vehicle is entered into the database 4 and tied to the cash card data stored in the database and also to the user-specific reference in the form of a telephone number or a personal PIN code.

When commencing parking of a vehicle, the parking system is informed of the parking zone concerned over the telephone.

This is done to ensure that the correct parking fee will be billed, bearing in mind that different parking fees are often charged in different parts of a town or city. Furthermore, the parking fee for resident parking may be lower than the parking fee for non-residents.

The parking zone concerned can be identified by dialling a telephone number that is specific to said zone. The number to be dialled can be displayed, e.g., on a conventional parking meter in the parking zone concerned.

In the simplest case, the credit card data, telephone number and vehicle reference in the form of a bar code are tied to each other in the database 4 of the server 5.

When parking is to be commenced, the user need only call a telephone number that is applicable to the parking zone concerned and that leads to the server 5. The telephone number is sensed and the time at which parking was commenced is stored together with the identity of the parking zone.

When parking is terminated, the user again calls the server 5, which therewith senses the telephone number. The server scans the database in which information is stored to the effect that parking has commenced earlier. The server therewith terminates the parking period.

The server 5 calculates the parking fee on the basis of the time for which the vehicle has been parked, the parking zone and the type of parking concerned. The server 5 then ties the parking fee to the credit card number stored in the server 5 and bills the credit card company 11, 12, 13, or 14 at a later stage, said company, in turn, billing the card owner, i.e., the user.

In this case, the user need only inform the system of the number of the parking zone when parking of the vehicle is commenced, and confirmation that parking is to be terminated.

According to the invention, parked vehicles are checked by a car park attendant causing a control unit 1 (see FIG. 1) to mechanically read the vehicle reference on the marked vehicle.

The car park attendant enters the parking zone in question into the control unit prior to checking the parked vehicles. This can be carried out by pressing appropriate buttons on a keypad 3, or by reading a bar code that discloses the identity of the parking zone, with the aid of a bar code reader. The bar code of the parking zone may, for instance, be found on a parking meter in the zone concerned.

A read vehicle reference is caused to be stored in the control unit, together with the current time of day. The car park attendant is able to scan a large number of vehicles in this way.

The contents of the control unit memory are transferred to the company computer at a later stage and there compared with parking commencement and parking termination information received by telephone with regard to respective vehicles. For instance, the car park attendant may transfer the contents of the control unit memory into the memory of the company computer after each working period or shift.

When making this comparison, the computer 4 sorts out those parked vehicles that have not registered the commencement of a parking period at the time of making the check. The company computer 4 is then caused to issue a parking fine with respect to these vehicles.

By only taking readings of those vehicles that are marked and collecting these readings in the memory of the control unit and thereafter making said comparison to establish which vehicles shall be given a parking fine or not in a separate stage, no data communication need be made between the control unit and the company computer when the controls or checks are made. Furthermore, the checks carried out by a car park attendant are restricted to the actual reading or scanning process.

Vehicles that are not marked are treated conventionally by the car park attendant.

It will be obvious that the drawbacks mentioned in the introduction are eliminated by the present invention.

A number of embodiments have been described in the aforegoing. Any appropriate form of code can be used instead of a bar code.

It will therefore be understood that the invention is not restricted to the aforedescribed embodiments thereof and that variations can be made within the scope of the following claims.

What is claimed is:

1. A parking control system in a parking system in which a telephone can be used by a parking system user to commence and to terminate parking of a vehicle within the parking system, said parking control system comprising: a receiving computer operatively connected with a database for storing user, vehicle, and parking time and zone information, wherein the user sends at least one code to the receiving computer via a telephone system when beginning and terminating a parking period, and wherein a user-specific vehicle reference is transmitted to the receiving computer to identify the vehicle, wherein billing for parking time is effected by the receiving computer into which an account number associated with the user is stored; a vehicle identification marker carried by the vehicle to be parked in the parking system to indicate use of a telephone to commence and to terminate a parking period; wherein information identifying a zone in which the vehicle is parked is transmitted by telephone to the receiving computer at the commencement of a parking period; a control unit for reading the vehicle reference for vehicles having a vehicle identification marker and for storing vehicle identification information together with the date and time of day; wherein information stored in the control unit is transferred to the receiving computer at a later time for comparison with information received by telephone and stored in the receiving computer relating to commenced and terminated parking of respective vehicles; and wherein parked vehicles for which a parking commencement time has not been stored in the receiving computer at the time the vehicle identification marker is read by the control unit are identified and a parking fine is issued in respect of said vehicles.

2. A parking control system according to claim 1, wherein the vehicle reference includes a bar code carried by the vehicle in a position in which the bar code can be read from outside the vehicle by a bar code reader.

3. A parking control system according to claim 1, wherein the vehicle reference includes a vehicle registration number.

4. A parking control system according to claim 3, wherein the vehicle identification marker is carried by a device applied to the vehicle.

5. A parking control system according to claim 1, wherein the telephone system is a mobile telephone system.

6. A parking control system according to claim 1, wherein the telephone system is a fixed telephone system.

7. A parking control system according to claim 1, wherein the vehicle reference is a machine-readable code.

8. A parking control system according to claim 1, wherein the account number is a credit card number.

9. A parking control system according to claim 4, wherein the identification marker is a sticker applied to the vehicle.

10. A parking control method in a parking system in which a telephone can be used by a parking system user to commence and to terminate parking of a vehicle within the parking system, and wherein the parking control system includes a receiving computer operatively connected with a database for storing user, vehicle, and parking time and zone information, said method comprising the steps of:

transmitting at least one code by a parking system user to the receiving computer via a telephone system when beginning and terminating a parking period;

transmitting to the receiving computer a user-specific vehicle reference to identify the vehicle;

storing in the receiving computer an account number associated with the user for billing the user for parking time;

providing a vehicle identification marker carried by the vehicle to be parked in the parking system to indicate use of a telephone to commence and to terminate a parking period;

transmitting to the receiving computer at the commencement of a parking period information identifying a zone in which the vehicle is parked;

providing a control unit for reading the vehicle reference for vehicles having a vehicle identification marker and for storing vehicle identification information together with the date and time of day;

transferred to the receiving computer at a later time information stored in the control unit for comparison with information received by telephone and stored in the receiving computer relating to commenced and terminated parking of respective vehicles; and identifying parked vehicles for which a parking commencement time has not been stored in the receiving computer at the time the vehicle identification marker is read by the control unit are identified and issuing a parking fine in respect of said vehicles.

11. A parking control method according to claim 10, wherein the vehicle reference includes a bar code carried by the vehicle, and including the step of reading the bar code from outside the vehicle by a bar code reader.

12. A parking control method according to claim 10, wherein the vehicle reference includes a vehicle registration number.

13. A parking control method according to claim 12, wherein the vehicle identification marker is carried by a device applied to the vehicle.

14. A parking control method according to claim 10, wherein the telephone system is a mobile telephone system.

15. A parking control method according to claim 10, wherein the telephone system is a fixed telephone system.

16. A parking control method according to claim 10, wherein the vehicle reference is a machine-readable code.

17. A parking control system according to claim 10, wherein the account number is a credit card number.

18. A parking control method according to claim 13, wherein the identification marker is a sticker applied to the vehicle.

* * * * *